US012668123B2

(12) United States Patent
Gudapati

(10) Patent No.: US 12,668,123 B2
(45) Date of Patent: Jun. 30, 2026

(54) VEHICLE SECUREMENT OVERRIDE SYSTEM

(71) Applicant: FCA US LLC, Auburn Hills, MI (US)

(72) Inventor: Abhilash Gudapati, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 92 days.

(21) Appl. No.: 18/913,343

(22) Filed: Oct. 11, 2024

(65) Prior Publication Data

US 2026/0103074 A1     Apr. 16, 2026

(51) Int. Cl.
| | |
|---|---|
| *B60K 28/04* | (2006.01) |
| *B60K 28/10* | (2006.01) |
| *B60K 28/12* | (2006.01) |
| *G07C 5/08* | (2006.01) |

(52) U.S. Cl.
CPC .............. *B60K 28/04* (2013.01); *B60K 28/10* (2013.01); *B60K 28/12* (2013.01); *G07C 5/0816* (2013.01)

(58) Field of Classification Search
CPC ........ B60K 28/04; B60K 28/12; B60K 28/02; B60K 28/10; G07C 5/0816
See application file for complete search history.

(56) References Cited

U.S. PATENT DOCUMENTS

| | | | |
|---|---|---|---|
| 2016/0311384 A1* | 10/2016 | Acuna ..................... | B60R 16/03 |
| 2017/0028966 A1* | 2/2017 | Elie ........................ | B60K 28/12 |
| 2018/0050668 A1* | 2/2018 | Spaulding ................ | B60K 6/22 |
| 2022/0297548 A1* | 9/2022 | Oh .......................... | B60T 8/245 |

* cited by examiner

*Primary Examiner* — Jacob M Amick
(74) *Attorney, Agent, or Firm* — Jeremy J. Klobucar

(57) ABSTRACT

A vehicle system configured with a user selectable override of an automatic vehicle securement feature to prevent an unoccupied vehicle from driving includes a PRND shifter, a Park button configured to command the vehicle into a Park position, a brake system controller with a parking brake, an occupant restraint controller to determine a driver seat belt status, and a body computer configured to determine if a driver door is ajar. A controller is programmed to initiate the automatic vehicle securement feature and engage the parking brake when conditions are met to prevent the vehicle from driving away, and override the automatic vehicle securement feature when a user presses the Park button for a predetermined period of time while the vehicle is already in the Park position, to thereby enable the user to drive the vehicle when the conditions for the automatic vehicle securement feature are met.

18 Claims, 4 Drawing Sheets

VEHICLE SECUREMENT OVERRIDE SYSTEM

FIELD

The present application relates generally to vehicle control systems and, more particularly, to vehicle control systems to enable user override of vehicle securement features.

BACKGROUND

Some vehicles are equipped with a drive away inhibition (DAI) or a vehicle securement function configured to prevent a vehicle from unintentionally driving away. This may occur when the driver exits the vehicle and Reverse, Neutral, Drive, or any other non-park PRND state is selected, while the brake pedal is not pressed, the seat belt is unbuckled, and the driver door is ajar. If such conditions are detected, and all enable criteria are met, the vehicle will activate the DAI strategy to secure the vehicle, for example, by automatically engaging a vehicle park pawl or electronic park brake. However, in some scenarios, the driver may not desire activation of the DAI function, for example when making tight parking maneuvers with the driver door open for visibility. Thus, while such systems work well for their intended purpose, it is desirable to provide continuous improvement in the relevant art to provide greater utility.

SUMMARY

In accordance with one example aspect of the invention, a vehicle system configured with a user selectable override of an automatic vehicle securement feature to prevent an unoccupied vehicle from driving away is provided. In one example implementation, the vehicle system includes a shifter configured to move the vehicle between Park, Reverse, Neutral, and Drive (PRND) positions, a Park button configured to command the vehicle into the Park position, a brake system controller configured to selectively engage and disengage a parking brake, an occupant restraint controller configured to determine a buckled or unbuckled status of a driver seat belt, a body computer configured to determine if a driver door is ajar, and a controller, having one or more processors, in signal communication with the shifter, the Park button, the brake system controller, the occupant restraint controller, and the body computer. The controller is programmed to initiate the automatic vehicle securement feature and engage the parking brake when one or more predetermined conditions are met, to thereby prevent the vehicle from driving away, and override the automatic vehicle securement feature when a user presses the Park button for a predetermined period of time while the vehicle is already in the Park position, to thereby enable the user to drive the vehicle when the one or more predetermined conditions for the automatic vehicle securement feature are met.

In addition to the foregoing, the described vehicle system may include one or more of the following features: wherein the controller is further programmed to disengage the parking brake when the override is performed and the vehicle is shifted from Park to Reverse, Neutral, or Drive; wherein the one or more conditions comprise each of the occupant restraint system indicates the driver seat belt is unbuckled, the body computer indicates the driver door is ajar, a brake pedal is not pressed, and the vehicle is not in Park; and wherein the predetermined period of time is greater than or equal to two seconds.

In addition to the foregoing, the described vehicle system may include one or more of the following features: wherein the controller is further programmed to re-enable the automatic vehicle securement feature when a speed of the vehicle exceeds a predetermined speed threshold; wherein the controller is further programmed to display, when the override is initiated, a notification on a vehicle human machine interface (HMI) that the automatic vehicle securement feature is disabled; and wherein the controller is further programmed to (i) detect, once the override is initiated, the vehicle is shifted from Park to Neutral, (ii) detect the vehicle is oriented above a predetermined threshold grade and freewheeling on an axle, indicating the vehicle is being towed, and (iii) continue to disable the automatic vehicle securement feature.

In addition to the foregoing, the described vehicle system may include one or more of the following features: wherein the controller is further programmed to (i) detect, once the override is initiated, the vehicle is shifted from Park to Neutral, (ii) detect the vehicle is oriented below a predetermined threshold grade and not freewheeling, (iii) detect the vehicle is being flat towed, and (iv) continue to disable the automatic vehicle securement feature; and wherein the controller is further programmed to (i) detect, once the override is initiated, the vehicle is shifted from Park to Neutral, (ii) detect a speed of the vehicle is below a predetermined speed threshold for a first predetermined time period, and (iii) subsequently initiate the automatic vehicle securement feature after a second predetermined time period has elapsed.

In accordance with another example aspect of the invention, a computer-implemented method is provided for operating a vehicle system for a vehicle configured with a user selectable override of an automatic vehicle securement feature to prevent an unoccupied vehicle from driving away. In one example, the vehicle includes a shifter configured to move the vehicle between Park, Reverse, Neutral, and Drive (PRND) positions, a Park button configured to command the vehicle into the Park position, a brake system controller configured to selectively engage and disengage a parking brake, and a controller having one or more processors and a non-transitory computer-readable storage medium.

In one example implementation, the method includes initiating, by the controller, the automatic vehicle securement feature and engage the parking brake when one or more predetermined conditions are met, to thereby prevent the vehicle from driving away, and overriding, by the controller, the automatic vehicle securement feature when a user presses the Park button for a predetermined period of time while the vehicle is already in the Park position, to thereby enable the user to drive the vehicle when the one or more predetermined conditions for the automatic vehicle securement feature are met.

In addition to the foregoing, the described method may include one or more of the following features: disengaging, by the controller, the parking brake when the override is performed and the vehicle is shifted from Park to Reverse, Neutral, or Drive; wherein the one or more conditions comprise each of the occupant restraint system indicates the driver seat belt is unbuckled, the body computer indicates the driver door is ajar, a brake pedal is not pressed, and the vehicle is not in Park; and wherein the predetermined period of time is greater than or equal to two seconds.

In addition to the foregoing, the described method may include one or more of the following features: re-enabling, by the controller, the automatic vehicle securement feature when a speed of the vehicle exceeds a predetermined speed threshold; displaying, by the controller and when the override is initiated, a notification on a vehicle human machine interface (HMI) that the automatic vehicle securement feature is disabled; and (i) detecting, by the controller and once the override is initiated, the vehicle is shifted from Park to Neutral, (ii) detecting the vehicle is oriented above a predetermined threshold grade and freewheeling on an axle, indicating the vehicle is being towed, and (iii) continuing, by the controller, to disable the automatic vehicle securement feature.

In addition to the foregoing, the described method may include one or more of the following features: (i) detecting, by the controller and once the override is initiated, the vehicle is shifted from Park to Neutral, (ii) detecting the vehicle is oriented below a predetermined threshold grade and not freewheeling, (iii) detecting the vehicle is being flat towed, and (iv) continuing, by the controller, to disable the automatic vehicle securement feature; and (i) detecting, by the controller and once the override is initiated, the vehicle is shifted from Park to Neutral, (ii) detecting, by the controller, a speed of the vehicle is below a predetermined speed threshold for a first predetermined time period, and (iii) subsequently initiating, by the controller, the automatic vehicle securement feature after a second predetermined time period has elapsed.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
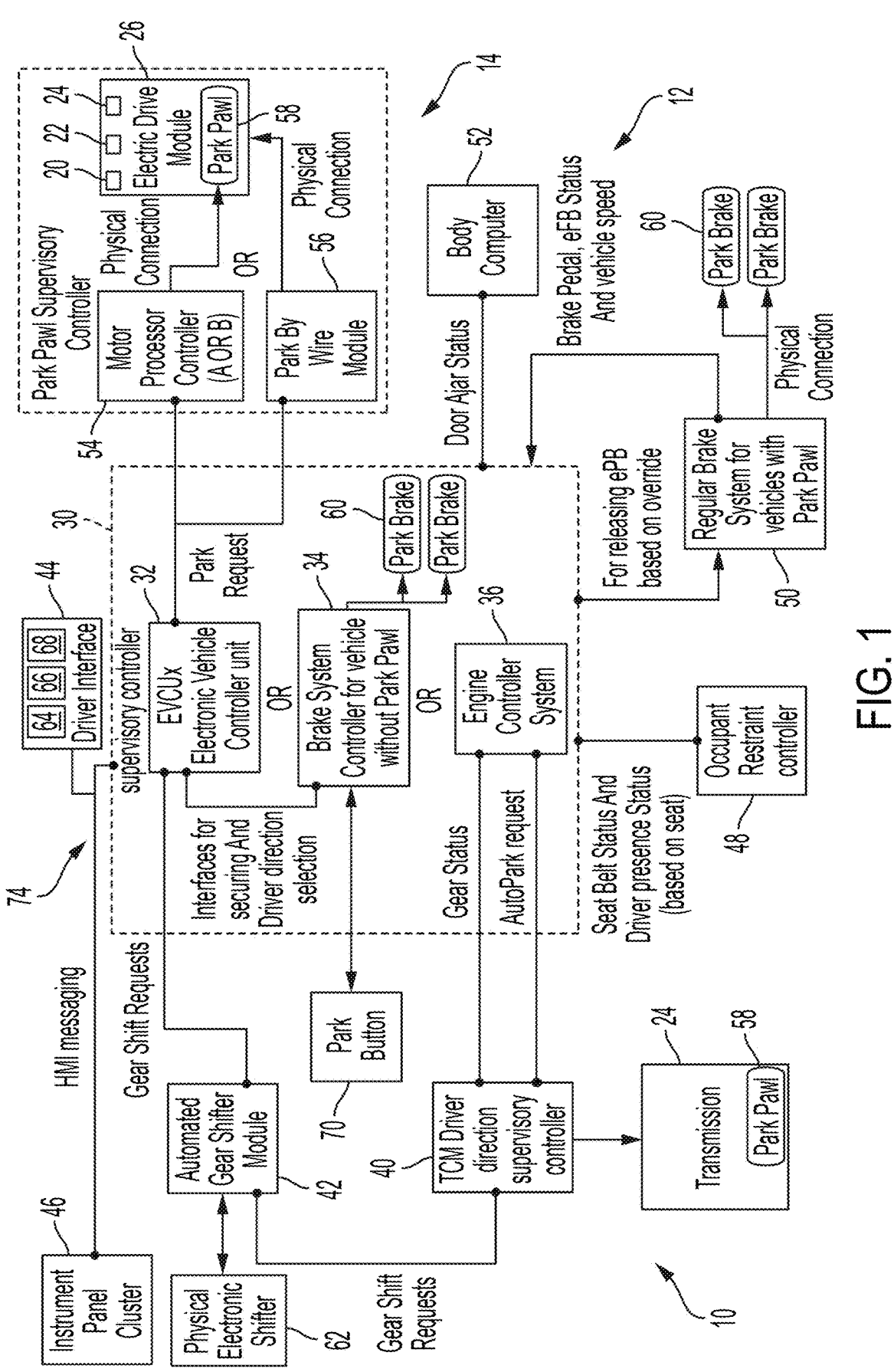
FIG. 1 is a schematic block diagram of an exemplary vehicle system according to the principles of the present disclosure.

As previously discussed, some vehicles are equipped with a drive away inhibition (DAI), or vehicle securement feature configured to prevent a vehicle from unintentionally driving away. If proper conditions are detected, the vehicle will activate the DAI strategy to secure the vehicle, for example, by automatically engaging a vehicle park pawl or electronic park brake (ePB). However, in some scenarios, the driver may not desire activation of the DAI function. Accordingly, described herein are systems and methods for user-selected override of the DAI function.

In general, the systems and methods described herein provide a user interface to override the vehicle securement feature by selecting a button, while in Park, to override Park (park pawl). The single override will disable ePB safe hold and release the ePB once a shift out of park is requested. The single interface will re-engage the park pawl and/or ePB. The user will be notified that vehicle securement systems are re-engaged when vehicle speed criteria is met. The system also protects for all unique scenarios where the user needs to use the mechanism without going through multiple steps and without requiring a driver presence sensor. The mechanism also protects for vehicles being towed by preventing securement of the vehicle once the override has been enabled, to thereby prevent damage.

In one example, DAI is enabled when (i) the vehicle is not Park, (ii) the driver door is open (if present) OR a driver presence sensor detects the driver is not present in the vehicle, (iii) the driver seat belt is unbuckled OR the driver presence sensor detects the driver is not present, (iv) the vehicle speed is less than a predetermined park engagement threshold (e.g., 2 kph), and (v) the brake pedal is not pressed. If these conditions are met, the vehicle is secured by engaging the park pawl, and "Auto Park Engaged" is displayed to the user on the instrument panel cluster. In parallel, the brake system which manages the ePB is engaged using similar conditions, but operates at a higher vehicle speed threshold (e.g., 4 kph) including accelerator pedal inputs.

The driver presence detection mechanism is generally used for vehicles which have an option to remove the door or have other doors where the driver could exit from. The brake system and a supervisory controller have separate arbitration of driver detection and securement for redundancy. In off-road vehicles, DAI is automatically disabled while in 4LO or a rock crawl mode. In vehicles with only an ePB (no park pawl), securement is managed by the brake system and the driver direction (e.g., PRND) is managed by a RND supervisory controller. Some vehicles include the DAI function in combination with a manual park brake.

As previously noted, the systems described herein enable a user to intentionally override the DAI function. In scenarios where all DAI enablement conditions are met, but the driver does not intend to exit the vehicle while in gear (e.g., during parking, back up, or maneuvering that requires the driver door open for visibility), the supervisory control shall allow the driver to override the DAI feature.

One example override operation is described as follows. DAI is activated due to the user exit detection, and the park pawl is engaged. A vehicle safe hold is also engaged due to the user exit detection, and the ePB is applied. The user moves the shifter out of Park by pressing the brake pedal with DAI conditions active, and "Auto Park Disabled" is then displayed to the user on the cluster. The user presses the ePB button (some implementations also requiring the seat belt buckled) to disengage the ePB. The user may then drive away, and the DAI feature will be re-engaged at a calibratable vehicle speed (e.g., 10 kph). However, this override requires multiple steps and may be inconvenient to some users. Accordingly, the following scenarios provide additional override operations.

Scenarios 1-3 below are for vehicles with a park pawl, ePB, and electronic shift (E-Shift) mono-stable systems with button-based selectors. Scenarios 4-6 are for vehicles with ePB only (no park pawl) and e-shift mono-stable systems with button-based selectors.

The first scenario provides override after activation of DAI and safe hold mechanism (ePB). In the first scenario, the driver door is ajar, the seat belt is unbuckled, and the brake pedal is not pressed. The park pawl is engaged and a human machine interface (HMI) "Auto Park Engaged" notification is displayed on the cluster by a supervisory controller. The ePB is applied and HMI "Park Brake Engaged" is displayed on the cluster by the brake system controller. The user then presses a Park button (override button) for a predetermined time (e.g., two seconds) and then selects an intended gear even with the driver door ajar and the seat belt unbuckled. The system may require the brake pedal to be pressed to shift out of Park due to a park brake shift interlock mechanism.

The supervisory controller will monitor for selection of the Park button with the vehicle already in Park, then shift to RND. The controller will display "Auto Park Disabled" (or similar) when the RND shift is honored (completed). It will be appreciated that all messages/notifications described herein may be provided in various ways with various other language/verbiage. The controller will command the brake system controller to disengage the ePB and "Park Brake Released" and "Safe Hold Temporarily Disabled" are displayed to the user. The operator can then drive the vehicle as intended per the override request. Once the vehicle speed is greater than a calibratable threshold (e.g., vehicle door locking speed), the controller will display "Auto-Securement Systems Re-Engaged" and send re-engagement function information to the brake system module.

In the second scenario, the override operation is performed after a first key ON (ignition on) with the propulsion system active for short maneuvers by the override. In the second scenario, the user starts the vehicle (propulsion system active) with the driver door ajar and the seatbelt unbuckled. The user then presses the Park button for a predetermined time (e.g., two seconds) and then selects an intended gear even with the driver door ajar and the seat belt unbuckled. The system may require the brake pedal to be pressed to shift out of Park.

The supervisory controller will monitor for selection of the Park button with the vehicle already in Park, then shift to RND. The supervisory controller will display "Auto Park Disabled" when RND are honored. The supervisory controller will command the brake system controller to disengage the ePB, if the ePB is engaged, and "Park Brake Released" and "Safe Hold Temporarily Disabled" HMI will be shown on the cluster. The operator can then drive the vehicle as intended per the override request. Once the vehicle speed is greater than a calibratable threshold (e.g., vehicle door locking speed), the supervisory controller will display "Auto-Securement System Re-Engaged" and sends a re-engagement threshold to the brake system module.

In the third scenario, override is provided for vehicle movement without the propulsion system inactive. In the third scenario, the driver door is ajar and the seat belt is unbuckled. The system may require the brake pedal to be pressed to shift out of Park, for example, due to a park brake shift interlock mechanism. The operator may not even be in the vehicle. The supervisory controller monitors for selection of the Park button with the vehicle already in Park, then a shift to Neutral. The supervisory controller will display "Neutral Active, Refer to Owner's Manual on Usage Restrictions" when Neutral is honored. The supervisory controller will then command the brake system controller to disengage the ePB if the ePB is engaged. The operator can then move the vehicle as intended per the override request.

There are no speed restrictions for re-enablement of securement features and a predetermined timer (e.g., 20 mins) is enabled if the vehicle grade is x % (e.g., greater than +/−5%, indicating the vehicle is being towed facing rear with front freewheeling and park pawl is on the vehicle rear wheels OR the vehicle is being towed facing front with the rear freewheeling and the park pawl is on the front wheels). Alternatively, if the vehicle is being flat towed based on the vehicle speed greater than a calibratable threshold (e.g., 2 mph) within a predetermined timer (e.g., 20 mins) for greater than a calibratable time period (e.g., 5 mins). If the vehicle grade is less than x % grade OR the vehicle speed is less than a calibratable speed (e.g., 2 mph) within a predetermined timer (e.g., 20 mins), if none of the conditions were true, the vehicle is secured after the predetermined timer to protect the low voltage (e.g., 12V) battery, for example, using the existing ignition OFF strategies. This is to avoid locking up of vehicles if a tow scenario is in progress. Only manual operator overrides to secure the vehicle are possible if conditions are met.

Scenarios 4-6 are intended for vehicles with ePB only and e-shift mono-stable systems with button-based securement selectors. In the fourth scenario, the override is performed before activation of DAI and the safe hold mechanism. The driver door is ajar, the seat belt is unbuckled, and the brake pedal is not pressed. The ePB will be applied and an HMI "Vehicle Secured" notification will be shown on the cluster by the supervisory controller, which shifts to a non-torque producing state such as Neutral. The user presses the Park button for a predetermined period of time (e.g., 2 seconds) and selects the intended gear even with the driver door ajar and the seatbelt unbuckled. This may require the brake pedal to be pressed to shift out of Park.

The ePB management system will monitor the Park button selection and the supervisory controller will monitor a user request for RND. The ePB management system releases the ePB once the supervisory controller sends its target RND state based on internal conditions. The ePB management system will display HMI "Auto-Securement Override Enabled" after RND are honored. The operator can then drive the vehicle as intended per the override request. Once the vehicle speed is greater than a calibratable threshold (e.g., vehicle door locking speed), the brake system controller will display "Auto-Securement System Re-Engaged" on the cluster.

In the fifth scenario, the override is performed after a key ON with the propulsion system active for short maneuvers, then the override. In the fifth scenario, the user presses the Park button for a predetermined period of time (e.g., two seconds) and then selects the intended gear even with the driver door ajar and the seat belt unbuckled. This may require the brake pedal to pressed to shift out of Park.

The ePB management system will monitor the Park button selection and the supervisory controller monitors the user request for RND. The ePB management system releases the ePB once the supervisory controller sends its target RND state based on internal conditions. The ePB management system will display an HMI "Auto-Securement Override Enabled" after RND are honored. The operator can then drive the vehicle as intended per the override request. Once the vehicle speed is greater than a calibratable threshold (e.g., vehicle door locking speed), the brake system controller will display "Auto-Securement System Re-Engaged" on the cluster.

In the sixth scenario, the user keys on the vehicle (without propulsion system active), with the driver door ajar, the seatbelt unbuckled, and the brake not pressed. The user presses the Park button for a predetermined amount of time (e.g., two seconds) and then selects the intended gear even with the driver door ajar and the seat belt unbuckled. The system may require the brake pedal to be pressed to shift out of Park due to a park brake shift interlock mechanism. The ePB management system monitors the Park button selection and the supervisory controller monitors the customer request for Neutral. The ePB management system releases the ePB, once the supervisory controller sends its target Neutral state based on internal conditions.

The ePB management system will display HMI "Neutral Active, Refer to Owner's Manual on Usage Restrictions" after Neutral is honored. The operator can then free wheel the vehicle as intended per the override request. There are no speed restrictions for re-enablement of securement features and a predetermined timer (e.g., 20 mins) is enabled, if the vehicle grade is –x % (e.g., greater than –5% calibration, meaning the vehicle is being towed facing rear for free-wheeling and the ePB is located on the rear wheels or vehicle being flat towed). Alternatively, if the vehicle is being flat towed based on vehicle speed greater than a calibratable speed (e.g., 2 mph) within a predetermined timer for greater than a calibratable time.

If the vehicle grade is less than x % grade OR the vehicle speed is less than a predetermined speed (e.g., 2 mph) within a predetermined time (e.g., 20 mins), if none of the conditions were true, the vehicle is secured after a predetermined time (e.g., 20 mins) to protect the 12V battery (using existing ignition OFF due to the securement mechanism). This is to avoid locking up of the vehicle if a tow scenario is in progress. Only manual operator overrides to secure the vehicle may be possible if conditions are met.

Referring now to FIG. 1, a schematic diagram of a vehicle system 10 for a vehicle 12 according to example implementations of the disclosure is illustrated. In accordance with various aspects of the present disclosure, interactive techniques for overriding drive away securement of the vehicle 12 are implemented utilizing the vehicle system 10. The vehicle 12 may have various configurations, propulsion systems, and controllers therefor and is illustrated as such. For example, the vehicle 12 may be an electrified vehicle, an internal combustion engine vehicle, or a combination thereof (e.g., hybrid-electric vehicle).

With continuing reference to FIG. 1, the exemplary vehicle system 10 of the exemplary electrified vehicle 12 includes an electrified powertrain or propulsion system 14 configured to transfer drive torque to a driveline (not shown) of the vehicle 12 for propulsion. The electrified powertrain 14 generally comprises a high voltage battery system (not shown), and one or more electric motors 20 with an associated inverter 22, and a gearbox or transmission 24. The one or more electric motors 20, the inverter 22, and the transmission 24 can be collectively referred to herein as an electric drive module 26. While the exemplary implementation includes a transmission 24, in some examples the electrified powertrain 14 does not include a transmission.

The vehicle system 10 further includes a supervisory controller 30, which may include an electronic vehicle controller unit (EVCU) 32, a brake system controller 34 (e.g., for a vehicle without a park pawl), and/or an engine controller 36. The supervisory controller 30 is in signal communication with a transmission control module (TCM) 40, an automated gear shifter management (AGSM) system 42, a driver interface 44, an instrument panel cluster 46, an occupant restraint controller 48, a brake system controller 50 (e.g., for vehicles with a park pawl), and a body computer 52.

The supervisory controller 30 includes one or more controllers (e.g., ECU, EVCU) configured to control operations of the vehicle 12. For example, controller 30 is configured to arbitrate park, reverse, neutral, and drive (PRND) after the driver selects a position through shifter inputs. In some cases, the controller 30 controls the park pawl system 60 directly. In EVs or range extended electric vehicles (REEVs), the park pawl can be managed directly by a motor processor controller 54.

The supervisory controller 30 is also in signal communication with the motor processor controller 54 for controlling the motor 20, as well as a park by wire module 56 configured to engage/disengage a park pawl 58. In the example imple-mentation, the motor processor controller 54, the park by wire module 56, and the EDM 26 may be collectively referred to as a park pawl supervisory controller. The TCM 40 is a controller for controlling the transmission 24, including engaging and disengaging the park pawl 58.

The brake system controller 34, 50 is configured to control one or more vehicle brakes, including one or more electronic parking brakes (ePB) 60 when present. The AGSM system 42 is in signal communication with a transmission shift request device, such as an electronic shifter 62, for the driver to request a desired gear of the transmission 24. The shifter 62 can provide conventional transmission options including park, reverse, neutral, drive and low (PRNDL).

The driver interface 44 includes a steering wheel 64, a brake pedal 66, and a driver input device (e.g., an accelerator pedal 68) for providing a driver input (e.g., a torque request) to the motor 20. The driver interface 44 also includes a transmission shift request device, such as the shifter 62, for the driver to request a desired gear (PRND) of the transmission 24. The driver interface 44 can further include a Park button 70 (shown separately) for manual override of the automatic vehicle securement feature, as described herein in more detail. In the example embodiment, the Park button 70 is located on the physical shifter 62 and is primarily utilized to shift the transmission 24 into the Park position. However, it will be appreciated that the Park button 70 may be a dedicated override button disposed in any suitable location within vehicle 12.

The instrument panel cluster 46 includes any human machine interface (HMI), such as a driver information center and/or vehicle infotainment system (e.g., touchscreen display) capable of receiving input from a driver. The instrument panel cluster 46, also referred to as HMI 46, is configured to provide various notifications to the user during the override process, as described herein. The occupant restraint controller 48 is configured to determine a seat belt status (e.g., buckled, unbuckled) and/or a driver presence status (e.g., based on a seat sensor, interior camera, etc.). The body computer 52 is configured to detect a status of the driver door (e.g., open/closed).

The transmission 24 and brake system controllers 34, 50 are coupled or selectively coupled, directly or indirectly, to one or more wheels (not shown) of vehicle 12, as is known in the art. In the exemplary vehicle system, all of the wheels are drive wheels that receive torque input. While the motor 20 is described herein as an electric traction motor, in other examples, the vehicle system 10 can be configured with a conventional internal combustion engine (ICE), or as a hybrid electric vehicle.

One or more controllers are utilized to control the various vehicle components or system discussed above. In one exemplary implementation, various individual controllers are utilized to control the various components/systems discussed herein and are in communication with each other and/or the various components/systems via a local interface 74. In this exemplary implementation, the local interface 74 is one or more buses or other wired or wireless connections, as is known in the art. In the example illustrated in FIG. 1, the local interface 74 is a controller area network (CAN). The CAN 74 may include additional elements or features, which have been omitted for simplicity, such as controllers, buffers (cache) drivers, repeaters and receivers, among many others, to enable communications. Further, the CAN 74 may include address, control and/or data connections to enable appropriate communications among the components/systems described herein.

It will be appreciated that while individual control units are discussed herein and shown in various Figures, the individual control units may also be optionally implemented in the form of one control unit, such as a powertrain or vehicle control unit. Thus, it will be appreciated that while the discussion will continue with reference to the individual controllers discussed above, the discussion is equally applicable to the components of vehicle system 10 being controlled by one controller.

As previously described, the vehicle system 10 is configured to provide the ability to override a vehicle securement feature, which automatically secures the vehicle from unintended movement via the park pawl 58 and/or ePB 60. Example override operations are described throughout, including the previously discussed six scenarios, as well as in FIG. 2. With reference now to FIGS. 1 and 2, systems and methods are provided for implementing the Vehicle Securement Override using the vehicle system 10.

Figure 2A:
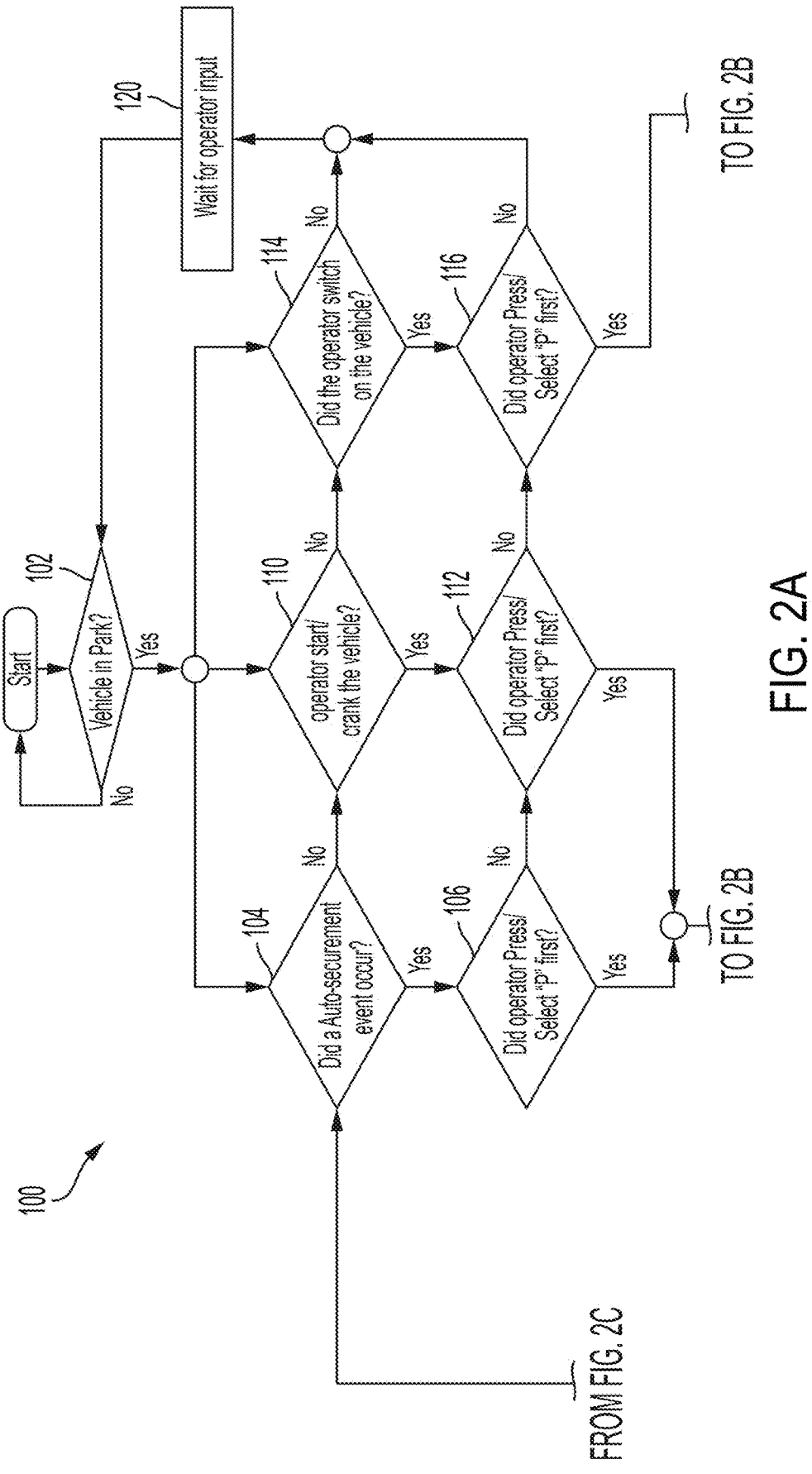
FIG. 2A-2C illustrate an example flow diagram of operating the vehicle system of FIG. 1 according to the principles of the present disclosure.
Figure 2B:
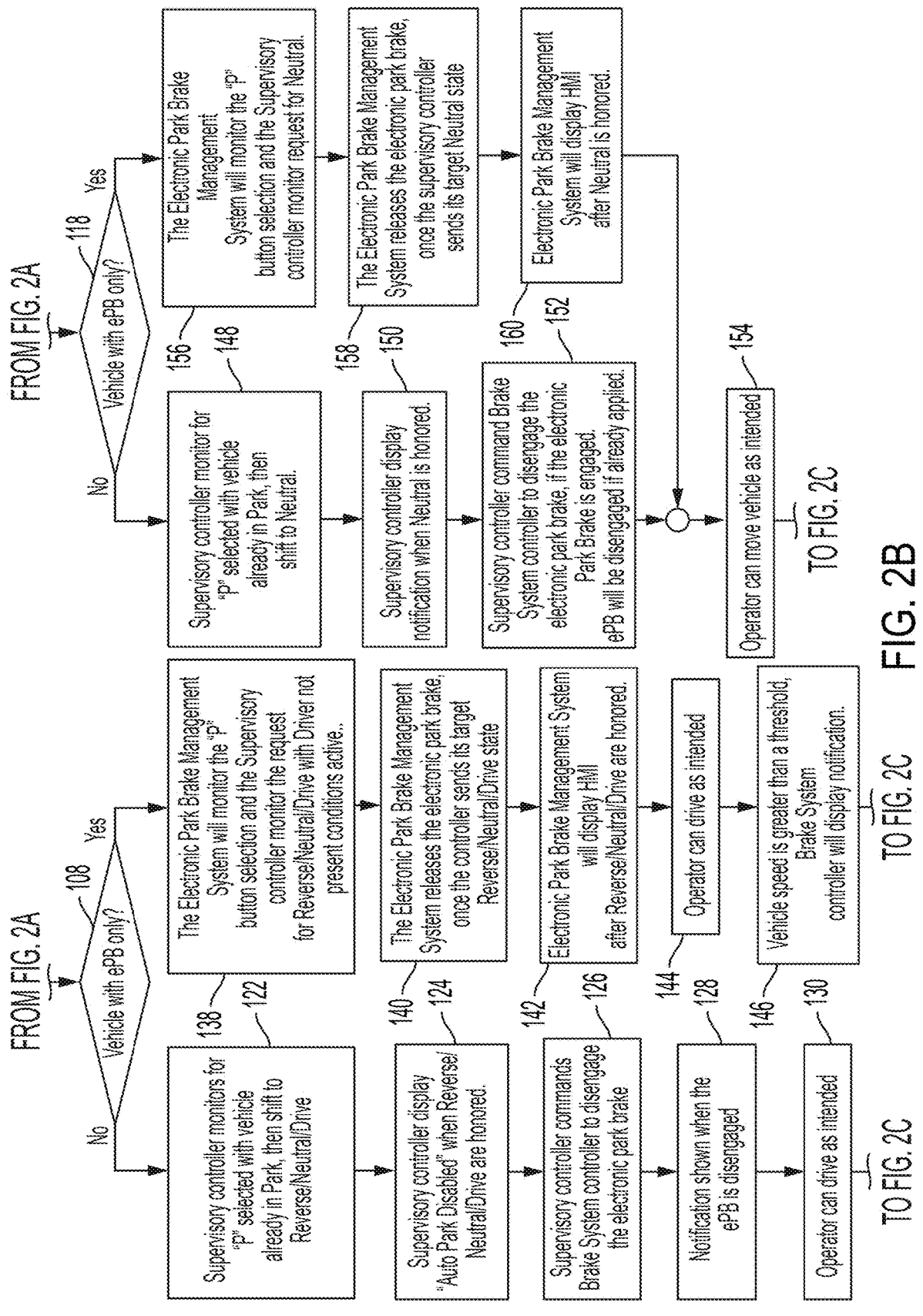
Figure 2C:
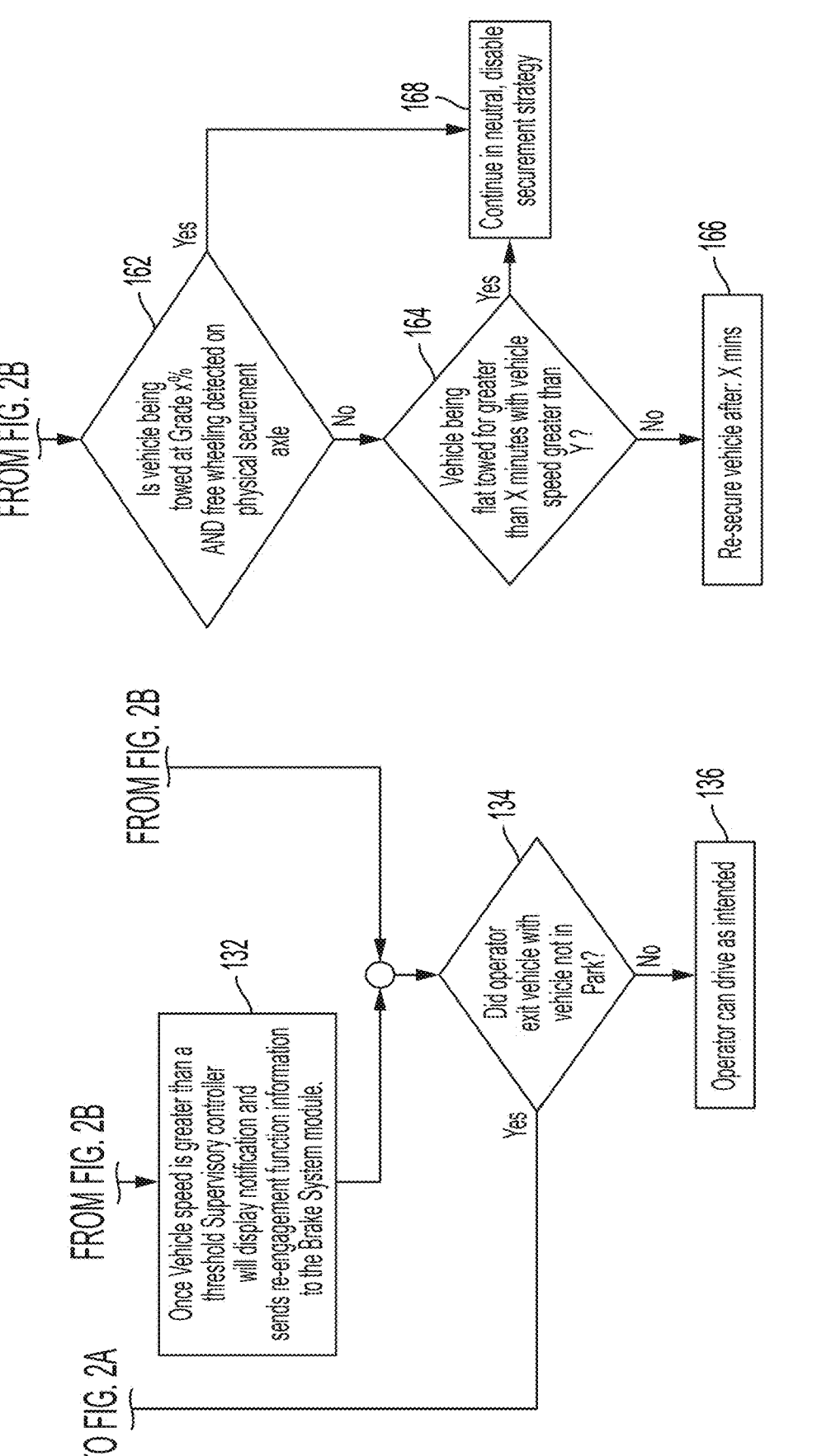

With reference now to FIGS. 2A-2C, an example method 100 for performing the Vehicle Securement Override with the vehicle system 10 is illustrated. While the vehicle system 10 and its components are specifically discussed for descriptive/illustrative purposes, it will be appreciated that the method 100 could be applicable to any suitable vehicle.

The method 100 begins at step 102 and the supervisory controller 30 ("control") determines if the vehicle 12 is in Park. If no, control ends or returns to start. If yes, control proceeds to steps 104, 110, and 114 to determine a status of the vehicle. At 104, control determines if an auto-securement event has occurred. For example, the park pawl 58 and/or ePB 60 are engaged due to 'driver not present' detection. If no, control proceeds to step 110. If yes, control proceeds to step 106 and determines if Park button 70 was pressed/selected first. If yes, control proceeds to step 108. If no, control proceeds to step 112.

Returning to step 110, control determines if the user initiated an ignition ON (propulsion system 14 active). For example, the user pressed the brake pedal 66 and keyed an ignition button. If no, control proceeds to step 114. If yes, control proceeds to step 112 and determines if Park was pressed/selected first. If yes, control proceeds to step 108. If no, control proceeds to step 116.

Returning to step 114, control determines if the user switched the vehicle on (propulsion system 14 not active). For example, the user keyed the ignition button without pressing brake pedal 66. If no, control proceeds to step 120 and waits for operator input, and then returns to 102. If yes, control proceeds to step 116 and determines if Park was pressed/selected first. If no, control proceeds to step 120. If yes, control proceeds to step 118.

Returning to step 108, control determines if vehicle 12 only includes ePB 60 (e.g., does not include park pawl 58). If no, control proceeds to step 122. If yes, control proceeds to step 138.

At step 122, control monitors for selection of the Park button 70 with the vehicle already in Park, then shifts to the RND with 'driver not present' conditions active. At 124, control displays a notification on HMI 44 that auto park is disabled when the RND shift is completed/honored. At 126, control commands the brake system controller 34 and/or 50 to disengage ePB 60. At 128, control provides an HMI notification that the ePB 60 is released and a vehicle 'safe hold' is temporarily disabled. At 130, the operator can then drive as intended. At 132, once the vehicle speed is greater than a predetermined threshold, control provides an HMI notification that the vehicle auto-securement system is re-engaged and sends re-engagement function information to brake system controller 34, 50. At 134, control determines if the driver has exited the vehicle while the vehicle 12 is not in Park. If yes, control returns to 104 and the vehicle is secured by the auto-securement feature. If no, the driver can then drive as intended. Control then ends or returns to 102 for one or more additional cycles.

Returning to step 138, when the vehicle only includes ePB 60, the brake system controller 34 monitors the Park button 70 and control monitors a driver request for RND with 'driver not present' conditions active. At 140, brake system controller 34 releases the ePB 60 once control sends its target RND state based on internal conditions. At 142, the brake system controller 34 displays a notification on HMI 44 that auto-securement override is enabled after the RND shift is completed. At 144, the driver can then drive as intended. At 146, once the vehicle speed is greater than a predetermined threshold, the brake system controller 34 displays a notification on HMI 44 that the auto-securement system is re-engaged. Control then proceeds to step 134.

Returning to step 148, when the vehicle 12 has both ePB and park pawl securement systems, the supervisory controller 30 monitors if the Park button 70 is pressed with the vehicle already in Park, and then a shift to Neutral. At 150, control provides, when the shift to Neutral is completed, a notification on HMI 44 that Neutral is active, and to refer to the owner's manual on usage restriction. At 152, control commands the brake system controller 34, 50 to disengage the ePB 60 (if already engaged). At step 154 the driver can operate the vehicle as intended. Control then proceeds to 162 and determines if the vehicle 12 is being towed at a predetermined grade (x %) and if freewheeling is detected on the vehicle axle configured for physical securement. If yes, control proceeds to 168 and continues in Neutral with the securement strategy disabled. If no, control proceeds to 164 and determines if the vehicle 12 is being flat towed for greater than a predetermined time limit and at a speed greater than a predetermined speed threshold. If yes, control proceeds to 168. If no, at step 166, control re-secures the vehicle after a predetermined time period.

Returning to step 156, when the vehicle 12 only includes ePB 60 (no park pawl 58), the brake system controller 34 monitors for selection of the Park button 70 and control monitors for a driver request for Neutral (e.g., via shifter 62). At 158, the brake system controller 34 releases the ePB once the supervisory controller 30 sends its target Neutral state based on internal conditions. At 160, the brake system controller 34 provides a notification on HMI 44, when the shift to Neutral is completed, a notification on HMI 44 that Neutral is active, and to refer to the owner's manual on usage restriction. Control then proceeds to step 154, as previously described.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A vehicle system configured with a user selectable override of an automatic vehicle securement feature to prevent an unoccupied vehicle from driving away, the vehicle system comprising:
   a shifter configured to move the vehicle between Park, Reverse, Neutral, and Drive (PRND) positions;
   a Park button configured to command the vehicle into the Park position;
   a brake system controller configured to selectively engage and disengage a parking brake;
   an occupant restraint controller configured to determine a buckled or unbuckled status of a driver seat belt;
   a body computer configured to determine if a driver door is ajar; and
   a controller, having one or more processors, in signal communication with the shifter, the Park button, the brake system controller, the occupant restraint controller, and the body computer, the controller programmed to:
      initiate the automatic vehicle securement feature and engage the parking brake when one or more predetermined conditions are met, to thereby prevent the vehicle from driving away; and
      override the automatic vehicle securement feature when a user presses the Park button for a predetermined period of time while the vehicle is already in the Park position, to thereby enable the user to drive the vehicle when the one or more predetermined conditions for the automatic vehicle securement feature are met.

2. The vehicle system of claim 1, wherein the controller is further programmed to disengage the parking brake when the override is performed and the vehicle is shifted from Park to Reverse, Neutral, or Drive.

3. The vehicle system of claim 1, wherein the one or more conditions comprise each of:
   the occupant restraint system indicates the driver seat belt is unbuckled;
   the body computer indicates the driver door is ajar;
   a brake pedal is not pressed; and
   the vehicle is not in Park.

4. The vehicle system of claim 1, wherein the predetermined period of time is greater than or equal to two seconds.

5. The vehicle system of claim 1, wherein the controller is further programmed to re-enable the automatic vehicle securement feature when a speed of the vehicle exceeds a predetermined speed threshold.

6. The vehicle system of claim 1, wherein the controller is further programmed to display, when the override is initiated, a notification on a vehicle human machine interface (HMI) that the automatic vehicle securement feature is disabled.

7. The vehicle system of claim 1, wherein the controller is further programmed to:

detect, once the override is initiated, the vehicle is shifted from Park to Neutral;
   detect the vehicle is oriented above a predetermined threshold grade and freewheeling on an axle, indicating the vehicle is being towed; and
   continue to disable the automatic vehicle securement feature.

8. The vehicle system of claim 1, wherein the controller is further programmed to:
   detect, once the override is initiated, the vehicle is shifted from Park to Neutral;
   detect the vehicle is oriented below a predetermined threshold grade and not freewheeling;
   detect the vehicle is being flat towed; and
   continue to disable the automatic vehicle securement feature.

9. The vehicle system of claim 1, wherein the controller is further programmed to:
   detect, once the override is initiated, the vehicle is shifted from Park to Neutral;
   detect a speed of the vehicle is below a predetermined speed threshold for a first predetermined time period; and
   subsequently initiate the automatic vehicle securement feature after a second predetermined time period has elapsed.

10. A computer-implemented method for operating a vehicle system for a vehicle configured with a user selectable override of an automatic vehicle securement feature to prevent an unoccupied vehicle from driving away, the vehicle including a shifter configured to move the vehicle between Park, Reverse, Neutral, and Drive (PRND) positions, a Park button configured to command the vehicle into the Park position, a brake system controller configured to selectively engage and disengage a parking brake, and a controller having one or more processors and a non-transitory computer-readable storage medium, the method comprising:
   initiating, by the controller, the automatic vehicle securement feature and engage the parking brake when one or more predetermined conditions are met, to thereby prevent the vehicle from driving away; and
   overriding, by the controller, the automatic vehicle securement feature when a user presses the Park button for a predetermined period of time while the vehicle is already in the Park position, to thereby enable the user to drive the vehicle when the one or more predetermined conditions for the automatic vehicle securement feature are met.

11. The method of claim 10, further comprising disengaging, by the controller, the parking brake when the override is performed and the vehicle is shifted from Park to Reverse, Neutral, or Drive.

12. The method of claim 10, wherein the one or more conditions comprise each of:
   the occupant restraint system indicates the driver seat belt is unbuckled;
   the body computer indicates the driver door is ajar;
   a brake pedal is not pressed; and
   the vehicle is not in Park.

13. The method of claim 10, wherein the predetermined period of time is greater than or equal to two seconds.

14. The method of claim 10, further comprising:
   re-enabling, by the controller, the automatic vehicle securement feature when a speed of the vehicle exceeds a predetermined speed threshold.

15. The method of claim 10, further comprising:

displaying, by the controller and when the override is initiated, a notification on a vehicle human machine interface (HMI) that the automatic vehicle securement feature is disabled.

16. The method of claim 10, further comprising:

detecting, by the controller and once the override is initiated, the vehicle is shifted from Park to Neutral;

detecting the vehicle is oriented above a predetermined threshold grade and freewheeling on an axle, indicating the vehicle is being towed; and continuing, by the controller, to disable the automatic vehicle securement feature.

17. The method of claim 10, further comprising:

detecting, by the controller and once the override is initiated, the vehicle is shifted from Park to Neutral;

detecting the vehicle is oriented below a predetermined threshold grade and not freewheeling;

detecting the vehicle is being flat towed; and continuing, by the controller, to disable the automatic vehicle securement feature.

18. The method of claim 10, further comprising:

detecting, by the controller and once the override is initiated, the vehicle is shifted from Park to Neutral;

detecting, by the controller, a speed of the vehicle is below a predetermined speed threshold for a first predetermined time period; and subsequently initiating, by the controller, the automatic vehicle securement feature after a second predetermined time period has elapsed.

* * * * *